United States Patent [19]

Schoenhard

[11] Patent Number: 4,660,585

[45] Date of Patent: Apr. 28, 1987

[54] APPARATUS FOR TREATMENT OF POLYMERIC MATERIAL

[75] Inventor: James D. Schoenhard, Morrison, Ill.

[73] Assignee: International Technology Services, Inc., Morrison, Ill.

[21] Appl. No.: 771,817

[22] Filed: Oct. 16, 1985

Related U.S. Application Data

[62] Division of Ser. No. 680,665, Dec. 12, 1984, Pat. No. 4,590,261.

[51] Int. Cl.$^4$ ............................................. B08B 3/08
[52] U.S. Cl. ...................................... 134/96; 134/111; 134/186; 210/220
[58] Field of Search ...................... 134/184, 186, 25.4, 134/34, 25.5, 111, 110, 94, 95, 96, 101; 366/136; 210/794, 795, 220, 221.1, 512

[56] References Cited

U.S. PATENT DOCUMENTS

| | | | |
|---|---|---|---|
| 1,314,955 | 9/1919 | Flicker | 210/221.1 X |
| 1,640,249 | 8/1927 | Perry | 210/221.1 |
| 1,802,726 | 4/1931 | Levine | 134/25.5 |
| 1,936,305 | 11/1933 | Leffler | 210/220 X |
| 2,040,941 | 5/1936 | Jones et al. | 210/220 X |
| 2,073,784 | 3/1937 | Day | 366/136 X |
| 2,537,904 | 1/1951 | McAllister, Jr. | 210/220 X |
| 2,582,802 | 1/1952 | Terrell, Jr. | 366/136 X |
| 2,742,381 | 4/1956 | Weiss et al. | 134/186 X |
| 2,774,585 | 12/1956 | Wirts | 210/220 X |

Primary Examiner—Harvey C. Hornsby
Assistant Examiner—Frankie L. Stinson
Attorney, Agent, or Firm—Cook, Wetzel & Egan, Ltd.

[57] ABSTRACT

The present invention is directed to a method and apparatus for the detoxification of polymeric film chip materials which have been contaminated with cyanide compounds during the process for the reclamation of their silver content. The present invention includes the steps of providing within a substantially impervious container a quantity of polymeric film chip materials containing a cyanide compound, and then submerging the cyanide containing polymeric film chip materials in a solution containing hypochlorite ion at a pH of approximately 9.5 to 10.5 until the cyanide in the polymeric film chip material is substantially converted into cyanate. In preferred alternative embodiments the treatment solution is replaced with a second treatment solution containing hypochlorite ion and having a pH of approximately 7.5 to 8 until the cyanate is substantially converted into carbon dioxide and nitrogen gases. Mixing means in the form of influent and effluent means are provided in such apparatus.

17 Claims, 3 Drawing Figures

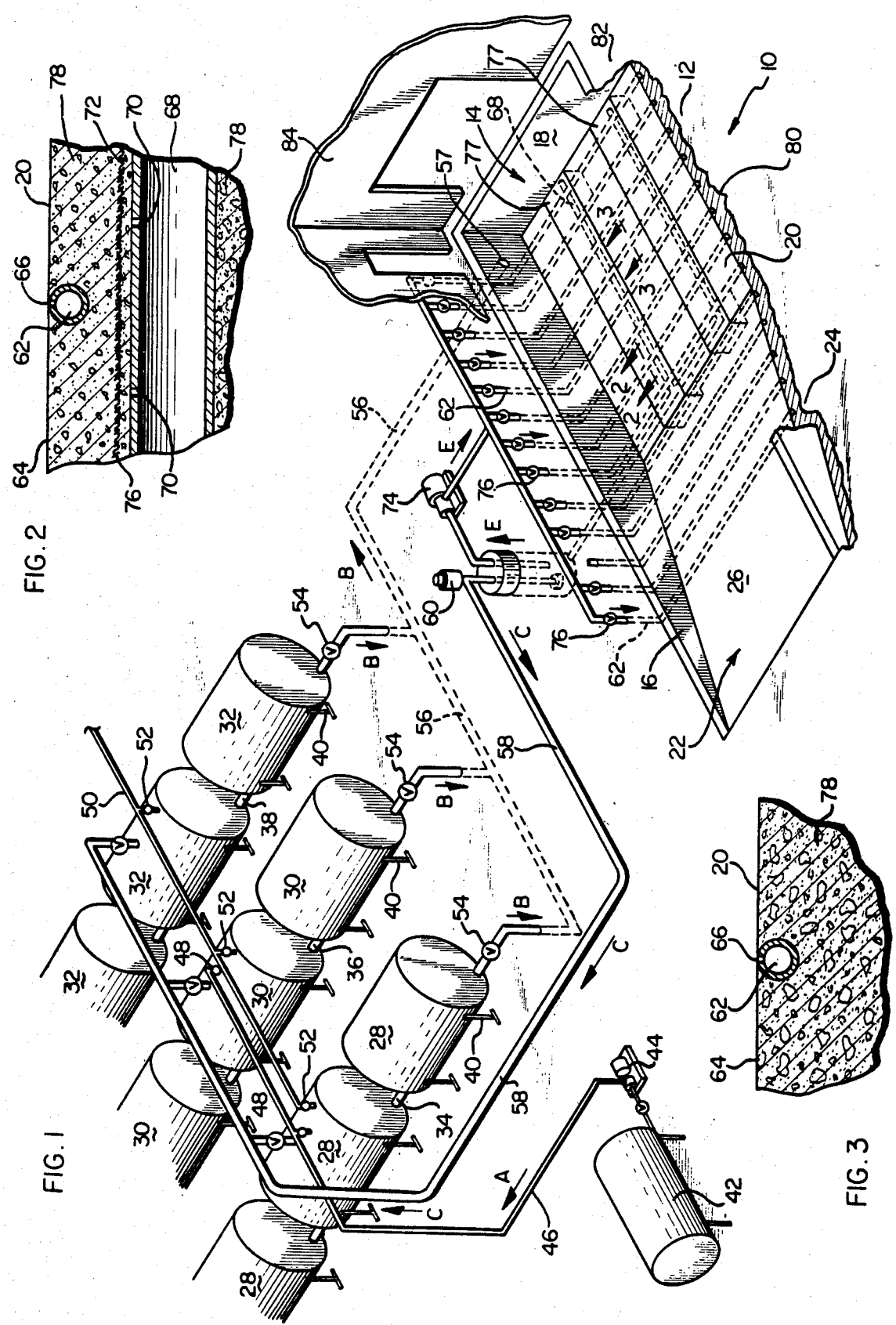

APPARATUS FOR TREATMENT OF POLYMERIC MATERIAL

This is a division of application Ser. No. 680,665, filed Dec. 12, 1984, now U.S. Pat. No. 4,590,261.

BACKGROUND OF THE INVENTION

The present invention is directed generally to decontamination and preservation of the environment, and more particularly to the detoxification of cyanide containing polymeric film chip materials.

A large volume of X-ray film is utilized each year by the medical profession. The silver halides contained within the developed X-ray film are most usually disposed upon a polyester or other polymeric film backing, and are recoverable by use of known processes. One such process is the cyanide process, which results in the contamination of the polymeric film chip material with cyanide compounds. Cyanide compounds are extremely toxic and extremely dangerous to members of the public. That is especially true when, for reasons of greed and/or malevolence, the cyanide contaminated film chip materials are discarded along highways, at unsafe de facto dump sites, and at other places by operators who have removed the silver halides, and do not wish to be burdened with the expense of disposing of the cyanide containing polymeric film chips. Accordingly, a problem of sizeable proportions involving the public health has been generated.

It is one purpose of the method and apparatus of the present invention to provide an efficient, relatively low cost, and safe solution to the above contamination problem. The method and apparatus of the present invention, and the means of solving the above problem will become more readily apparent to those having ordinary skill in the art upon review of the following Summary of the Invention, Brief Description of the Drawing, Detailed Description of Preferred Embodiments, accompanying Drawing, and appended Claims.

SUMMARY OF THE INVENTION

The method for detoxification of polymeric film chip materials of the present invention provides a method of detoxifying cyanide compounds contained upon such polymeric film chip materials. The method comprises the steps of providing within a substantially impervious container a quantity of polymeric film chip materials containing a cyanide compound, and then submerging the cyanide containing polymeric film chip materials in a solution containing hypochlorite ion at a pH of approximately 9.5 to 10.5 until the cyanide in the polymeric film chip material is substantially converted into cyanate. In preferred alternative embodiments the treatment solution is replaced with a second treatment solution containing hypochlorite ion and having a pH of approximately 7.5 to 8 until the cyanate is substantially coverted into carbon dioxide and nitrogen gases.

The additional step of circulating the treatment solutions is also contemplated, in which the cyanide containing polymeric material is submerged to assure complete contact with the treatment solution, and to provide additional unreacted solution thereto. Such mixing may be done at selected portions of the container. The method of the present invention further comprises checking the decontaminated material for any residual cyanide.

The apparatus of the present invention for the detoxification of cyanide contained in polymeric film chip materials includes a container for such cyanide containing film chip materials which is substantially impervious to cyanide migration therethrough. A plurality of treatment solution influent mixing headers are exposed at a bottom portion of the container and spaced array at a sufficient number and density to provide inflow of the hypochlorite containing treatment solution substantially across the width in length of said container. A plurality of treatment solution effluent draw off piping having effluent apertures therein for drawing the treatment solution therein are disposed in spaced array substantially across the width and length of the container to provide draw off of the hypochloride containing solution. The container further includes a loading ramp at one end thereof comprising a sloping portion for accomodating the loading of a substantial quantitiy of cyanide containing polymeric film chip material. Pump means are provided for introducing, circulating and withdrawing the treatment solution.

The apparatus for the detoxification of cyanide containing polymeric film chip material of the present invention further includes influent mixing headers disposed approximately normal in the vertical plane to the treatment solution effluent draw off piping. Also, in the detoxification apparatus of the present invention, the treatment solution influent mixing headers are preferably disposed in the horizontal plane above the level of the treatment solution effluent draw off piping. In such embodiments, the container has a bottom surface and the treatment solution influent mixing headers are disposed below the level of the bottom surface of the container.

BRIEF DESCRIPTION OF THE DRAWING

The method for the detoxification of cyanide containing polymeric film chip material of the present invention, and an exemplary apparatus in which the method for the detoxification of polymeric film chip materials contaminated with cyanide compounds of the present invention may be practiced are set forth in the drawing, and in some detail in the following figures, in which:

FIG. 1 is a perspective view of one such apparatus capable of carrying out the method of the present invention illustrating the concentrated sodium hypochlorite delivery with associated chemical feed pump for pumping the hypochlorite solution to the storage tanks for dilution and storage, further showing gravity feed to the treatment container for mixing and showing a treatment container mixing pump and chemical solution return tank, with the treatment container having a plurality of treatment solution influent mixing headers, and a plurality of treatment solution effluent draw off headers for controlled mixing of the treatment solution;

FIG. 2 is a greatly enlarged transverse, cross sectional view taken along line 2—2 of FIG. 1 illustrating at the top and disposed in concrete an influent mixing header having an influent aperture therein for pumping treatment solution into the treatment container, with an effluent draw off header disposed therebeneath and having the treatment solution receiving apertures thereof covered by filter means for non-clogging filtration of the used treatment solution therethrough; and FIG. 3 is a greatly enlarged transverse cross-sectional view taken along line 3—3 of FIG. 1 illustrating the disposition of an influent header at a location wherein the transversely disposed effluent draw off headers are not present.

DETAILED DESCRIPTION OF PREFERRED EMBODIMENTS

The method for the detoxification of polymeric film chip material contaminated with cyanide compounds of the present invention is a method including the first step of providing within a container a quantity of polymeric film chip material containing a cyanide compound. The cyanide containing polymer film chip material is submerged in a first treatment solution until the cyanide in or on the polymeric film chip material is substantially converted into cyanate. The first treatment solution contains hypochlorite ion, with the solution maintained at a pH of approximately 9.5 to 10.5. Next, in some preferred embodiments, the container has charged to it an additional treatment solution containing hypochlorite ion, wherein the alkalinity of the solution has been reduced to approximately 7.5 to 8. In such alternative embodiments, submersion of the then cyanate containing film chips in the resultant solution is maintained until the generated cyanate is substantially converted into carbon dioxide and nitrogen gases. Thereafter, the cyanide-free polymeric material is washed with water, and is removed from the container. The decontaminated polymeric material may be discarded, or recycled, such as, in shredded form for textile use.

In some preferred embodiments the additional step is provided of circulating the treatment solutions in and around the cyanide containing polymeric film chip material to assure complete contact with the treatment solution of such polymeric material, and to provide additional unreacted treatment solution thereto. Such mixing may be performed in selected portions of the container. Also in such preferred embodiments, at least a substantial portion of the treatment solution containing the hypochlorite ion may be removed prior to charging additional treatment solution at a lower pH to the container for reaction. The treatment solution may preferably be charged to the container at a rate of approximately 250 to 300 gallons per minute.

The polymeric film chip material after such rinsing is preferably tested for the presence of any residual cyanide. The quantity of the polymeric film chip material containing a cyanide compound is provided for treatment at a mean density of approximately 25 pounds per cubic foot.

In such preferred embodiments, the treatment solutions are circulated by continuously drawing off a portion of the treatment solution and continuously returning the drawn off treatment solution to the container. Such drawing off and returning of solution to the container is performed preferably substantially near the bottom of the quantity of polymeric film chip material treated. Such continuous drawing off and returning of at least one of the treatment solutions is to be performed at a rate sufficient to recirculate the entire volume of the treatment solution within approximately 30 minutes.

The above treatment solutions may be saved for reuse in a subsequent batch of cyanide containing polymeric film chip material.

In these preferred embodiments the treatment solutions are applied to the polymeric film chip material at a rate of approximately 2 to 10 gallons per minute per square foot. The above circulation rate is sufficient to suspend in the treatment solution a substantial portion of the polymeric film chip material. The untreated cyanide containing polymeric film chip material generally contains at least approximately one pound of cyanide compound per ton.

In preferred embodiments the cyanide is reduced to cyanate, with residual remaining cyanide being reduced to below approximately 5.5 parts per million (ppm). Such treatment may require approximately 3.5 to 4 hours of treatment.

The polymeric film chip material generally comprises a polyester resin. In the alternative preferred embodiments of the present invention a portion of the polyester may be converted during such treatment into a polyurethane.

The apparatus of the present invention for carrying out the above method and other related methods is directed to an apparatus for the detoxification of cyanide containing polymeric film chip material. The apparatus includes a container for the cyanide containing polymeric film chip material having walls and a bottom which are substantially impervious to cyanide migration therethrough. The container preferably includes a loading ramp at one end which has a sloping surface for accommodating the loading of a substantial quantity of cyanide containing polymeric film chip material, such as by means of a dump truck or other means.

The apparatus includes at least one treatment solution storage tank for storing the hypochlorite ion containing solution prior to use thereon, for returning the hypochlorite containing treatment solution thereto, and for storage of such solution until it is exhausted by subsequent uses. Conduit means are provided for connecting the treatment solution storage tank to the container for flow of the treatment solution therethrough to and from the container.

A plurality of treatment solution influent mixing headers is disposed at a bottom portion of the container in spaced array, and in a sufficient number and density to provide substantial flow through influent apertures located in the influent mixing heads. The apertures are provided for the outflow of hypochlorite ion containing treatment solution substantially across the width and length of the container.

A plurality of treatment solution effluent draw off piping means is also provided. Such draw off piping includes effluent apertures located preferably at a top portion thereof for drawing treatment solution thereinto. The draw off piping is disposed in spaced array substantially across the width and length of the container to provide draw off of hypochlorite ion containing treatment solution substantially uniform within the container.

Pumps are operatively connected to the treatment solution influent mixing headers and to the treatment solution effluent draw off piping for providing controlled influent and effluent flow, with the result that inflow mixing and outflow of the treatment solution within the container are provided. The apparatus of the present invention also includes at least one tank for storing the hypochlorite ion containing treatment solution for supplying such treatment solution to the pumps.

The treatment solution influent mixing headers are preferably disposed approximately normal in the vertical plane to the treatment solution effluent draw off piping. Such influent mixing headers are preferably disposed in the horizontal plane above the level of the treatment solution effluent draw off piping.

In the apparatus of the present invention in preferred embodiments, the container has a bottom surface and the treatment solution influent mixing headers are disposed below the level of such bottom surface of the container. The treatment solution influent mixing headers include upwardly directed influent apertures which communicate with and into the container at substantially the level of the bottom surface of the container. Filtration means are preferably disposed above the treatment solution effluent draw off piping and preferably in shallow troughs, for preventing clogging of the effluent apertures by the cyanide containing polymeric film chips and for permitting passage of only effluent treatment solution therethrough. Such filtration means preferably comprises a fabric material.

In preferred embodiments of the apparatus of the present invention, the pump means comprises separate influent and effluent pumps.

The container for the cyanide containing film chip materials is preferably formed of concrete. The treatment solution influent mixing headers are substantially sealed within and surrounded by the concrete container, except for the influent apertures thereof. In preferred embodiments, the concreted walled container is enclosed within an earthen berm. Such earthen berm preferably communicates with a earthen catchment basin, and an impermeable, chemically inert liner extends around the exterior of the container to substantially the top of the berm. A covering enclosure, such as a building, is preferably built over the container to enclose the same from the elements.

In preferred embodiments of the apparatus of the present invention, treatment solution delivery means for conveying the hypochlorite ion containing treatment solution to the treatment solution storage tanks are provided. Also, conduit means connecting the container and the treatment solution storage tanks preferably include outflow and inflow portions. In such preferred embodiments the outflow portion of the conduit means as is disposed for gravity feed. Outflow valves may be provided on individual tanks.

Referring now to the drawing and to FIG. 1 in particular, one embodiment of the apparatus of the present invention generally 10 for carrying out the above inventive method and other related methods is shown. Such apparatus 10 is for the detoxification of cyanide containing polymeric film chip material. The apparatus 10 includes a treatment tank or container for the cyanide containing polymeric film chip material 12 to be placed within the volume generally 14 thereof. Container 10 has side walls 16 and back wall 18, and a bottom surface 20. Walls 16, 18 and bottom 20 are substantially impervious to cyanide migration therethrough. Container 12 perferably includes a loading ramp generally 22 at one end 24 which has a sloping surface 26, for accomodating the loading of a substantial quantity of cyanide container polymeric film chip material, such as by means of a dump truck or other means.

Apparatus 10 preferably includes a plurality of first treatment solution storage tanks 28 for storing the higher pH hypochlorite ion containing solution prior to use thereof and for returning the higher pH hypochlorite containing treatment solution thereto, and for storage of such solution until it is exhausted by subsequent uses. Similar treatment solution storage tanks 30 are provided for the lower pH treatment solution. Rinse water storage tanks 32 are also provided. Respective storage tank connection pipes 34, 36, 38 connect respective storage tanks 28, 30, 32. Storage tanks 28, 30, 32 each are supported on tank feet 40.

A delivery tank 42 is disposed externally from storage tanks 28, 30, 32 for containing sodium hypochlorite solution at a concentration of preferably 15%, which may be delivered by tanker. A chemical feed pump 44 connects delivery tank 42 with storage tanks 28, 30 by means of delivery conduit 46 which includes valves 48, 48 (Arrow A). Storage tanks 28, 30, 32 are interconnected preferably of at least 8000 gallon capacity, and delivery tank 42 has a capacity of at least 4000 gallons. Storage tanks 28, 30, 32 are interconnected by interconnect conduit 50, such as for utilizing the rinse water in storage tank 32 in either of treatment solution tanks 28, 30 for dilution. Interconnect conduit 50 utilizes valves 52.

Storage tanks 28, 30, 32 are equipped with valves 54 which connect with gravity draining influent conduit means 56.

Influent conduit means 56 in turn connect by means of opening 57 to container 12 for flow of the treatment solutions therethrough to container 12 (Arrow B). Return or effluent conduit means 28 interconnect container 12 with storage tanks 28, 30, 32 by means of a treatment solution return pump 60 (Arrow C).

As shown in FIGS. 1, 2 and 3, a plurality of treatment solution influent mixing headers 62 are disposed at a bottom portion 64 of container 12 in spaced array and in a sufficient number and density to provide inflow through influent apertures 66 located in the influent mixing headers 62 (Arrow D). Apertures 66 are provided for the outflow of hypochlorite ion containing treatment solution substantially across the width and length of container 12 to provide mixing.

A plurality of treatment solution effluent draw off pipe means 68 are also provided. Such draw off pipes 68 includes effluent apertures 70 located preferably at a top portion 72 thereof for drawing treatment solution thereinto. The draw off pipe 68 is disposed in spaced array substantially across the width and length of container 12 to provide draw off of hypochlorite ion containing treatment solution substantially uniformly within container 12.

A treatment tank mixing pump 74 operatively connects the treatment solution influent mixing headers 62 and to the treatment solution effluent draw off pipe 60 for providing controlled influent and effluent flow, with the result that inflow mixing and outflow of the treatment solution within container 12 are provided (Arrow E).

Treatment solution influent mixing headers 62 which include valves 76 are preferably disposed approximately normal in the vertical plane to the treatment solution effluent draw off pipe 68. As shown particularly in FIG. 2, such influent mixing headers 62 are disposed in the horizontal plane above the level of treatment solution effluent draw off pipe 68.

As shown in FIGS. 2 and 3, in the apparatus of the present invention 10 in preferred embodiments, container 12 has a bottom surface 20 and treatment solution influent mixing headers 62 are disposed below the level of such bottom surface 20 of container 12. Treatment solution influent mixing headers 62 include upwardly directed influent apertures 66 which communication with and into container 12 at substantially the level of bottom surface 20 of container 12. Filtration means 76, as shown in FIG. 2, are preferably disposed above treatment solution effluent draw off piping 68 for preventing clogging of piping effluent apertures 70 by the cyanide containing polymeric film chips and for permitting passage of only effluent treatment solution therethrough. Such filtration means 76 preferably comprise a fabric material. Effluent draw off pipes 68 are disposed within shallow troughs 77, as shown in FIG. 1.

The container 12 for the cyanide containing film chip materials is preferably formed of concrete 78. As shown in FIGS. 2 and 3, treatment solution influent mixing headers 62 are substantially sealed within and surrounded by the concrete bottom 78 of container 12, except for influent apertures 66 thereof. In preferred embodiments the concreted walled container is enclosed within an earthen berm 80. Such earthen berm 80 preferably communicates with an earthen catchment basin, and an impermeable, chemically inert liner (not shown) extends around the exterior 82 of container 12 to enclose the same from the elements.

The sodium hypochlorite first treatment solution is maintained at a pH of approximately in the range of 9.5 to 10.5 within tanks 28 formed from fiberglass and having at least an 8000 gallon capacity. The second sodium hypochlorite solution, which is maintained at a pH of approximately 7.5 to 8, is also contained within a fiberglass tank 30 having an 8000 gallon capacity. Rinse water storage is provided in similar tanks 32, and a reserve tank may likewise be provided in such dimensions and formed from fiberglass. A vacuum equipped tank truck to recover film chips from the surrounding area, and wash water solutions from the surrounding area, is likewise preferred for use in conjunction with the present method and apparatus invention. The pumps 44, 60, 74 which are suitable for use in the apparatus 10 of the present invention are of the chemical transfer variety, which are impervious to highly alkaline chemicals and to cyanide.

Precautions are also preferably taken to prevent accidental ignition or reaction of ignitable, reactive or incompatible waste.

No materials to be handled on site are considered ignitable, with the possible exception of the film chips, which are the only type of wastes to be handled at the site. Each piece of equipment operating within the buildings 84 is to be equipped with fire extinguishers.

In addition, a fire prevention department is prefereably located nearby and responsible for onsite fire safety. Also preferred is a manned onsite vehicle with at least a 250 gallon water storage and self-contained pumping unit for immediate response to fire. Fire extinguishers having an appropriate purple K extinguishing chemical should be provided for all equipment operating at the site where fires involving cyanide, sodium, and/or chloride could occur. Extinquishers must be located in appropriate building areas, as well. Appropriately classified extinguishers are to be located in accordance to area classification. Fire extinquishers must comply with 29 CFR 1910 (OSHA). All locations shall be signed in accordance with the class of fire hazard. Personnel will be instructed in the proper use of extinquishers.

Emergency escape routes are to be identified and posted. Personnel will be advised of procedures to follow in the event of a fire emergency.

Protective clothing is to be required for personnel employed at the site. Protective clothing should also be provided for regulatory personnel, individuals collecting samples and other visitors to the site.

Personnel working in the chip storage buildings 84 should be provided with suits designed to afford complete body coverage to prevent body contact with dust and chips. Replaceable element respirators must be worn. The chemical respirators must conform to Subpart K (230) of Title 30, Code of Federal Regulations, Part 11.

Personnel working in chemical handling and transfer areas will be provided with chemical protective suits. The suits will be made of chemically inert material that can be decontaminated if necessary. Suits will be provided with and without internal pressure valves and liquid cooling equipment. Suits with the cooling option will be worn when work times are prolonged. Suits without the cooling option will be available for short duration work tasks around process chemicals.

Visitors will be directed first to the site supervisor for indoctrination. Visitors will not be allowed into work areas for other than sample collection purposes. A viewing window should be provided for observation of the treatment tanks from the building exterior during processing. Visitors should be required to follow all safety regulations. Regulations should be posted.

A safety inspection checklist should be developed with the following major categories and subcategories provided for illustration:

Fire Protection (extinquishing equipment, hoses, exits, etc.)

Housekeeping (aisles, floors, lighting and ventilation, etc.)

Tools (power tools, wiring, hand tools, storage, etc.)

Personal Protection (clothing, gloves, respirators, etc.)

Material Handling Equipment (power equipment, trucks, pumps, etc.)

Bulletin Boards and Signage

Machinery (pumps, electrical, maintenance, guards, etc.)

Pressure Equipment (compressed air, gas cylinders, metering equipment, piping, valves, etc.)

Unsafe Practices (accident reporting, improper operation of vehicles, horseplay, improper work techniques, etc.)

First Aid (kits, emergency showers and eyewash, injury reports, etc.)

Miscellaneous (acids and caustics, dusts and vapors, debris, utilities, etc.)

Records are to be kept in accordance with OSHA regulations. Such records will include a log of occupational injuries and illnesses, OSHA Form 100, a supplementary record of each occupational injury or illness. OSHA Form 101, records of employee exposure to toxic substances or harmful physical agents and other records such as logs of inspection and tests required by the standards.

Methods to control dust or odor, and protection from wind must be provided. Film chips should not be handled outside of buildings 84 or enclosing structures. At all times the chips should be isolated from the elements, including wind and rain under the roofs of the existing storage buildings or the structures enclosing the treatment tanks.

For safety, chips delivered from distant sources should be off loaded into the treatment tank or container 12 directly from the trucks. The treatment tanks should thus be equipped with a ramp 26 so that trucks can back down the ramp 26 beneath an enclosing structure and dump the chips onto the floor or bottom 20 of the treatment tank or container 12. The chips may then be pushed into the tank by a front end loader for uniform distribution, if necessary.

Significant amounts of dust and odor are not anticipated due to the totally enclosed nature of the facility.

Daily clean up operations are to be utilized.

Daily operations are to be ceased by dewatering the last batch of chips treated and by loading the chips on trucks for hauling from the site. Trucks must be available and on schedule to prevent delays in material handling. Coordination of arrival of trucks should be accomplished to ensure that no delays in loading operations occur. In the event delays occur, treated chips could be hauled to and stored in areas designated by the environmental body having jurisdiction.

All treatment chemicals should be contained in process chemical fiberglass storage tanks 28, 30, 32. All building access aisles should be cleared to permit unrestricted access.

A roll call should be taken of all personnel on site. Site visitors should be logged on and off the site. The log should be verified at the end of the working day.

All equipment should be shut down and serviced as necessary for the following days work.

All equipment should be inspected for physical and operating condition. Equipment requiring repair in addition to routine maintenance should be repaired prior to the next days operation.

All tanks should be inspected for condition and chemical concentration.

All buildings should be cleared of personnel and secured until the next days work. Equipment operating inside should be secured within the buildings.

Security guards should be advised of the status of personnel on site if any are to remain for administrative work after normal working hours.

Only one type of waste should be delivered to the site for treatment. The waste is cyanide tainted polymeric film chips. The chips should be examined upon delivery to the site. The trucks should be screened for materials other than film chips. Any materials other than film chips should not be accepted and further handling other than reloading on dump trucks should not be done.

The film chips should be sampled prior to departure from the treatment facility site. The chips must be monitored for cyanide reactivity before and after each batch is treated. Each truck load should be sampled and the sample analyzed. Trucks must not be off loaded at the ultimate destination until the results of the analyses confirm the chips are satisfactorily decontaminated. Unsuitable test results would result in the return of the material for additional treatment.

The system will be a closed loop system. The chemicals used during the process will be enclosed within the treatment tanks or container 12 and chemical handling vessels 28, 30, 32 until work is completed.

The chemical processing tanks and process chemical storage tanks 28, 30, 32 are to be located in an area adjacent to one of the treatment tanks or container. The area is to be bermed 80 to prevent escape of liquids from the area. The tank topography must be sloped to drain toward the treatment tanks 12 to contain accidental spillage within the arena of operation.

An additional storage tank should be provided for containment of chemicals captured in the event a tank develops a leak. This storage tank will serve as a standby storage vessel to be used not only in the event additional storage is needed, but to provide flexibility in the opportunity to fine tune chemical concentrations without interrupting processing.

In addition, a second treatment tank 12 may be provided and maintained empty while the first tank is being used for treatment. The second tank will then be readily accessible and available for additional spill storage.

In preferred embodiments, total treatment chemical solutions on site should be approximately 16,000 gallons. Total storage capacity of treatment tanks, water and chemical storage vessels will be 103,800 gallons. The tank area will be surrounded with a dike enclosing an area sufficient to contain any stored liquid spills.

In one preferred embodiment, calculations to balance flow volumes from the 8,000 gallon sodium hypochlorite solution tanks 28, 30 with treatment tank liquid and film chip capacity have been done.

The tank volume above the drain system is 3,467 cubic feet.

The volume of the drawoff piping is about 49 cubic feet.

The volume of the mixing header piping is about 68 cubic feet.

The volume of the voids in the graveled area is 150 cubic feet.

Total volume is 3,662 cubic feet.

The volume the film chips would occupy is estimated to be 2,275 cubic feet. A value of 25 lb/cf for film chip bulk density is to be used. At 25 lb/cf each treatment tank would contain 56,875 pounds of film chips.

Based on 10,000,000 pounds of film chips, 175 batches would be treated. Based on a quantity of 4,500,000 pounds of film chips, 79 additional batches of film chips would be treated.

Assuming a truck will hold 30 cubic yards of film chips, 810 cubic feet of film chips would be delivered per truck. Each tank can thus accommodate about 2.8 truckloads of film chips.

It has been estimated that four batches can be processed per day. Thus, it would take 60 days to process 254 batches without taking into consideration any operations other than processing film chips.

The mixing system shown on the accompanying Drawing consists of tank effluent drawoff piping 68, influent mixing header piping 62 and valves 76. The system, using a 250 gallon per minute pump, will cause the liquid in the tank to be turned over once every 32 minutes. Solution will be applied at a rate of 2 to 10 gallons per minute per square foot. At these rates the film chips will be thoroughly contacted with solution. The rate of mixing can be varied by controlling the number of mixing header valves 76 that are open at any one time. This also enables localized mixing.

This level of mixing is not violent enough to cause splashing at the surface of the treatment container 12. It should however, be sufficient to suspend a good portion of the chips in the solution. Thus, the mixing system should behave in a manner similar to a water treatment plant filter. Such filters are designed to partially fluidize a bed of low specific gravity filter medium at flows of 10 gallons per minute per square foot. For example, sand is fully suspended at flows of 25 gallons per minute. Under any of these conditions no splashing occurs. The observable water movement consists of surface currents.

In the method of the present invention, the question of salt accumulation in the system during the course of treatment must be addressed. In one preferred embodiment, the treatment consists of a two step process. Sodium chloride is used in the first two, reactive steps, and a rinse water in a final, third step. These solutions are stored in three 8,000 gallon capacity tanks. Salt will accumulate in significant quantities during the process, but not to saturation levels.

The solubility of salt in water is 36.5 grams per 100 grams of water. This is about 365,000 mg/l. In an 8,000 gallon tank of water, the weight of the salt would be 24,353 pounds.

The chemical equations for the two step process are:

1ST STEP:
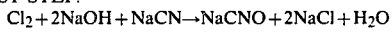
$$Cl_2 + 2NaOH + NaCN \rightarrow NaCNO + 2NaCl + H_2O$$

In this step, 2.73 pounds of chlorine are required per part of cyanide and 3.07 parts of sodium hydroxide are required per part of cyanide. Thus, the amount of salt produced is 4.5 pounds per pound of cyanide.

2ND STEP:
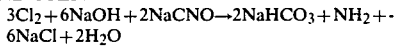
$$3Cl_2 + 6NaOH + 2NaCNO \rightarrow 2NaHCO_3 + NH_2 + 6NaCl + 2H_2O$$

In this step, 6.82 pounds of chlorine and 7.69 pounds of sodium hydroxide are required per pound of cyanide. The amount of salt produced is 6.73 pounds per pound of cyanide.

The amount of reactive cyanide present in a ton of film chips is estimated conservatively to be 1.0 pound. In a typical batch of 56,875 pounds of film chips, the total amount of cyanide would be 28.4 pounds.

The amount of salt produced per batch in step one would be 128 pounds. The salt would be dissolved. The amount of salt produced per batch in step two would be 191 pounds, also dissolved.

The salt would accumulate in the 8,000 gallons of sodium hypochlorite solutions and the rinse water, since treatment tank drawdown results in the carry over of water into each operation. The salt concentration should be allowed to reach a 2% solution before disposing of the solution and replenishing with new solution.

The first step tank 28 would reach a 2% solution in a .8 treatment batches. The second tank 30 would reach a .2% solution in 7 batches. Hence, treatment solutions will have to be replenished approximately every two days.

The rinse water tank 32 will accumulate salt at a lesser unknown rate. Thereafter, the rinse water will be used as makeup water for the first two tanks 28, 30. Interconnect conduit 50 with valves 52 may be used for that purpose. Also, the tank 32 is to be monitored for usefulness as rinse water. When unsuitable for rinsing purposes or makeup water purposes, the rinse water solution should be disposed of in the same manner as spent sodium hypochlorite.

The spent sodium hypochlorite should be adjusted to neutral pH and trucked to a suitable site for disposal into preferably municipal treatment works. The disposal should be at low rates over several hours to take advantage of dilution by existing waste water flows.

The amount of sodium hydroxide required for step one throughout processing is 22,500 pounds and for step two, 56,250 pounds.

The amount of chlorine required for step one is 20,000 pounds and for step two, 50,000 pounds.

Several variables will affect these predicted quantities of chemical production. Some solution will remain on treated chips after rinsing. Also, the accumulation of salt in the separate treatment and rinse tanks most likely will not coincide with the theoretical values predicted. The amounts of caustic and chlorine required may be somewhat higher. On the other hand, these quantities may be somewhat lower, since the 1.0 pound of cyanide per ton of film chip figure may be conservative.

In actual operation, the salt concentration in the sodium hypochlorite solutions can be monitored. The concentration can be compared to the reaction time to achieve complete cyanide destruction. The salt concentration in the rinse water solution can also be monitored. These values can be correlated with pH and treatment times to optimize the use of reactants.

As set forth in preferred embodiments of the present invention, the facility for spill containment must be constructed to conform with federal spill prevention control and countermeasure regulations.

The entire storage area should be enclosed within an earthen berm 80. The ground should be excavated to permit installation of an impermeable, chemically inert liner extending to the top of the berm. The liner is covered with material excavated for the treatment tanks and storage area. The area is sloped to a containment basin. The basin is sized to contain 2500 cubic feet of liquid or the contents of two of the largest tanks on site.

The basin will also collect rainwater during processing of chips. This water can be used for treatment by addition to the process chemical tanks or by direct addition into the full treatment tanks. Specific chemical spills to the catchment basin can be returned to the appropriate tank by sump pump.

Testing to confirm destruction of cyanide is done by EPA approved methods. The levels to be achieved are 10 mg/l total cyanide and 1 mg/l free or reactive cyanide. The tests and methods used are as follows:

Reference: Methods for Chemical Analysis of Water and Waste

EPA 600/4-79-020, March 1979 with supplement EPA 600/4-82-055, December 1982

Total Cyanide by distillation, Method 335.2 with spectrophotometric measurement.

Free Cyanide by the method described above, but omitting the distillation step.

The method used for measuring toxic metals is the extraction procedure—toxicity for metals:

Reference: Test Method for Evaluating Solid Waste

EPA Publication SW 846, July 1982, 2nd Edition. Method 1310. Digestion on extracts is method No. 10.

The methods for individual metals are

| | |
|---|---|
| As | Method 7060 |
| Ba | 7080 |
| Cd | 7130 |
| Cr | 7190 |
| Pb | 7420 |
| Hg | 7470 |
| Se | 7741 |
| Ag | 7760 |

Each batch of film chips treated is sampled and analyzed for the above constituents. Batches which failed must be retreated for cyanide removal. The treatment process proposed is not highly effective in treating certain metal cyanides which are not amenable to chlorination. However, indications are that these metals should not be present at significant levels.

The tests to be conducted at the end of each batch treatment for each batch of chips treated include total cyanide, free cyanide and EP toxicity. Daily testing of each batch prior to treatment should not be necessary. Additionally, pilot testing should be performed during the tank erection period to confirm treatability and to determine more accurately the amounts and concentrations of chemicals necessary to perform treatment, as well as the contact times required to achieve treatment.

During processing the pH of all chemical solutions should be measured by pH probe. The treatment tank cyanide activity levels should also be measured throughout processing in accordance with the cyanide-selective electrode method 412 E of Standard Methods for the Examination of Water and Wastewater.

Chemicals remaining at the end of processing are analyzed by the methods described above for contaminants. Regardless of the level of contaminants, the solutions remaining are treated by special waste handling facilities capable of treating the sodium hypochlorite solutions. Solids remaining after treatment are disposed of in approved hazardous waste landfills.

It is apparent that disposal of these solutions, even if testing shows them to be harmless, is not politically or publically acceptable in many localities. For this reason, all such solutions remaining should be handled as hazardous waste.

One purpose of the mixing system proposed is to bring the cyanide tainted polymeric film chips into contact with the solution of sodium hypochlorite used for treatment.

The method of mixing utilized in preferred embodiments is by treatment solution recirculation. Influent and effluent mixing headers are located as shown in FIGS. 1-3, and the number, location and size of conduits and piping is sufficient to permit an adequate rate of mixing flow.

The specific gravity of the chips is about 1.85 grams per milliliter or 115.4 pounds per cubic foot. The bed of chips is fluidized in much the same manner as a bed of coal in a water purification filter. Coal used for this purpose has a specific gravity of 1.65 to 1.70. Full suspension is not believed to be necessary for effective contacting of treatment solution and chips. The chips do not tend to agglomerate if some mixing is provided.

The recommened backwash rate for coal is 10 gallons per minute per square foot of filter or basin area. At a flow rate of 1200 gallons per minute, a 10 gallon per minute per square foot can be achieved in a part of the tank. In these embodiments, to achieve this rate, the piping must meet certain specifications.

In these embodiments, individual influent mixing headers must be six inch diameter, rather than 2 and ½ inches as in other embodiments. Headers must be spaced every three feet, rather than every five feet. The tank drain effluent piping is increased from six to eight inch diameter. Air connections can also be provided to permit applying compressed air into the mixing header system 62, 68 as an optional or supplemental mixing medium.

Gas emissions from the facility housing the treatment tanks must be monitored and alarms installed.

Emission control equipment should be installed in the event gas scrubbing is necessary.

The treatment tank buildings are equipped with real time monitors with alarms to alert personnel to dangerous levels of gases. Persons working within areas of potential gas occurence will be equipped with personal sampling pumps to measure long term exposure. In addition, emissions are monitored to determine levels of gas discharge from the building.

Although various minor modifications may be suggested by those versed in the art, I do wish to embody within the scope of the patent warranted hereon all such modifications as reasonably and properly come within the scope of my contributiion to the art.

What is claimed is:

1. An apparatus for the detoxification of cyanide containing polymeric film chip material, said apparatus comprising:

a container for the cyanide containing polymeric film chip material having walls and bottom which are substantially impervious to cyanide migration therethrough, said container having a loading ramp at one end thereof comprising a sloping surface for accommodating loading of a substantial quantity of cyanide containing polymeric film chip material;

at least one treatment solution storage tank means for storing a hypochlorite ion containing treatment solution prior to uses thereof and for returning the hypochlorite ion containing treatment solution thereto until it is exhausted;

conduit means connecting said treatment solution storage tank means and said container for flow of the treatment solution therethrough to and from said container;

a plurality of treatment solution influent mixing headers disposed substantially beneath the polymeric film chip material being treated, at a bottom portion of said container in spaced array, and in a sufficient number and density to provide inflow through influent apertures therein of the hypochlorite ion containing treatment solution substantially across the width and length of said container to flow upwardly to contact and percolate through the polymeric chip material;

a plurality of treatment solution effluent draw off pipes having effluent apertures therein for drawing treatment solution thereinto, said draw off pipes disposed substantially beneath the polymeric film chip material being detoxified, and in spaced array substantially across the width and length of said container to provide draw off of the hypochlorite ion containing treatment solution within said container; and pump means operatively connected to said treatment solution influent mixing headers and to said treatment solution effluent draw off pipes for providing controlled influent and effluent flow to provide inflow, mixing and outflow of the treatment solution within said container.

2. The apparatus for the detoxification of cyanide containing polymeric film chip material of claim 1 wherein said treatment solution influent mixing headers are disposed approximately normal in the vertical plane to said treatment solution effluent draw off piping.

3. The apparatus for the detoxification of cyanide containing polymeric materials of claim 1 wherein said container has a bottom surface and said treatment solution influent mixing headers are disposed below the level of said bottom surface of said container.

4. The apparatus for the detoxification of cyanide containing polymeric materials of claim 3 wherein said treatment solution influent mixing headers include upwardly directed influent apertures which communicate with and into said container at substantially the level of said bottom surface of said container.

5. The apparatus for the detoxification of cyanide containing polymeric materials of claim 1 further comprising filtration means disposed above said treatment solution effluent draw off pipes for preventing clogging thereof by the cyanide containing polymeric film chips and for permitting passage of only effluent treatment solution therethrough.

6. The apparatus for the detoxification of cyanide containing polymeric materials of claim 5 wherein said filtration means comprises a fabric material.

7. The apparatus for the detoxification of cyanide containing polymeric materials of claim 1 wherein said pump means comprises separate influent and effluent pumps.

8. The apparatus for the detoxification of cyanide containing polymeric materials of claim 1 wherein said treatment solution influent mixing headers are substantially sealed within and surrounded by said concrete except for the influent apertures thereof.

9. The apparatus for the detoxification of cyanide containing polymeric film chip material of claim 1 wherein said container is enclosed within an earthen berm.

10. The apparatus for the detoxification of cyanide containing polymeric film chip material of claim 1 further comprising covering enclosure means for said container.

11. The apparatus for the detoxification of cyanide containing polymeric film chip material of claim 1 further comprising treatment solution delivery means for conveying the hypochlorite ion containing treatment solution to said treatment solution storage tank means.

12. The apparatus for the detoxification of cyanide containing polymeric film chip material of claim 1 wherein said conduit means connecting said container and said treatment solution storage tank means comprises outflow and inflow portions.

13. The apparatus for the detoxification of cyanide containing polymeric film chip material of claim 12 wherein said outflow portion of said conduit means is disposed for gravity feed.

14. An apparatus for the treatment of a solid material, said apparatus comprising:
- a container for the solid material to be treated having walls on the bottom which are substantially impervious to liquid migration therethrough, said container having a loading ramp at one thereof comprising a sloping surface for accommodating loading of a substantial quantity of the solid material to be treated;
- at least one treatment solution storage tank means for storing a treatment solution prior to uses thereof and for returning the treatment solution thereto until it is exhausted;
- conduit means connecting said treatment solution storage tank means and said container for flow of the treatment solution therethrough to and from said container;
- a plurality of treatment solution influent mixing headers disposed substantially beneath the solid material being treated, at a bottom portion of said container in spaced array, and in a sufficient number and density to provide inflow through influent apertures therein of the treatment solution substantially across the width and length of said container to flow upwardly through to contact and percolate through the material being treated;
- a plurality of treatment solution effluent draw off pipes having effluent aperatures therein for drawing treatment solution thereinto, said draw off pipes disposed substantially beneath the solid material being treated, at a level beneath said influent mixing head, and in spaced array substantially across the width and length of said container to provide draw off of the treatment solution within the container; and
- pump means operatively connected to said treatment solution influent mixing headers and to said treatment solution effluent draw off pipes for providing controlled influent and effluent flow to provide inflow, mixing and outflow of the treatment solution within said container.

15. The apparatus for the detoxification of cyanide containing polymeric film chip material of claim 14 further comprising an impermeble, chemically inert liner extending around the exterior of said container to substantially the top of said berm.

16. An apparatus for the treatment of polymeric material, said apparatus comprising:
- a container for polymeric material having walls and a bottom, said container having a loading ramp at one end thereof comprising a sloping surface for accommodating loading of a substantial quantity of said polymeric materials;
- at least one treatment solution storage tank means for storing a treatment solution prior to and between uses thereof until it is exhausted;
- conduit means containing said treatment solution storage tank means and said container for flow of the treatment solution therethrough to and from said container;
- a plurality of treatment solution influent mixing headers disposed at a bottom portion of said container in spaced array and in a sufficient number and density to provide inflow through influent apertures therein of the treatment solution substantially across the width and length of said container;
- a plurality of treatment solution affluent draw off pipes having affluent aperatures therein for drawing treatment solution thereinto, said draw off pipes disposed in spaced array substantially across the width and length of said container to provide draw off of the treatment solution within said container; and
- pump means operatively connected to said treatment solution influent mixing headers and to said treatment solution affluent draw off pipes and to said storage tank means for providing control influent and effluent flow to provide inflow, mixing and outflow of the treatment solution within said container and to and from the storage tank means.

17. The apparatus of claim 16 wherein the treatment solution contains a hypochlorite ion.

* * * * *